United States Patent
Suzuki et al.

(10) Patent No.: US 7,019,480 B2
(45) Date of Patent: Mar. 28, 2006

(54) SYNCHRONOUS-MOTOR CONTROLLER

(75) Inventors: Kenji Suzuki, Anjo (JP); Hiromichi Agata, Anjo (JP); Tatsuyuki Uechi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/902,810

(22) Filed: Aug. 2, 2004

(65) Prior Publication Data

US 2005/0046379 A1     Mar. 3, 2005

(30) Foreign Application Priority Data

Sep. 3, 2003   (JP) .............................. 2003-311679

(51) Int. Cl.
*H02H 7/093*   (2006.01)
(52) U.S. Cl. ...................... 318/472; 318/254; 318/432; 318/434; 361/24
(58) Field of Classification Search ................ 318/138, 318/254, 430–434, 471–473, 720–724; 388/903, 388/907.5, 909, 934; 361/23–33
See application file for complete search history.

(56) References Cited

U.S. PATENT DOCUMENTS

| | | | | |
|---|---|---|---|---|
| 5,857,349 A | * | 1/1999 | Hamaoka et al. | 62/228.4 |
| 5,934,398 A | * | 8/1999 | Hotta | 180/65.8 |
| 6,114,828 A | * | 9/2000 | Matsunaga et al. | 318/782 |

FOREIGN PATENT DOCUMENTS

JP       A 9-215388       8/1997

OTHER PUBLICATIONS

Ken Dutton, et al:"The Art of Control Engineering", Addison-Wesley Publishing, 1997. p. 40 teaches the method of calculating temperature increment of a device as a function of time.*

* cited by examiner

Primary Examiner—Bentsu Ro
(74) Attorney, Agent, or Firm—Oliff & Berridge, PLC

(57) ABSTRACT

A synchronous-motor controller including an inverter for converting direct current to alternating current in order to supply a synchronous motor with a current responsive to a torque instruction value, a temperature sensor for measuring a temperature of the inverter and a control unit. The control unit detects a locking of the synchronous motor although current is supplied to the synchronous motor and calculates, based on the torque instruction value, a heating value of a switching element of the inverter at the time when the switching element is supplied with the current after the synchronous motor is in a locked condition, wherein a temperature of the switching element is estimated by adding the calculated heating value to an initial value of the temperature of the inverter measured by the temperature sensor when the locking of the synchronous motor is detected.

20 Claims, 4 Drawing Sheets

SYNCHRONOUS-MOTOR CONTROLLER

INCORPORATION BY REFERENCE

The disclosure of Japanese Patent Application No. 2003-311679 filed on Sep. 3, 2003 including the specification, drawings and abstract are incorporated herein by reference in its entirety.

BACKGROUND OF THE INVENTION

1. Field of Invention

The invention relates to a controller for driving a synchronous motor while protecting an inverter from overheating.

2. Description of Related Art

Switching elements of inverters generally generate heat rapidly when synchronous motors are locked. The switching elements thus cannot be perfectly protected by simply measuring a temperature of the inverters with sensors and then limiting the current to be supplied to the inverters based on the measured temperature. The switching elements cannot be perfectly protected by using these steps because the difference between a measured temperature and an actual temperature of the switching elements is significantly large. Therefore, various techniques have been developed which prevent the overheating of switching elements by accurately estimating the temperature of the switching elements. JP-A-9-215388 (Paragraphs [0032]–[0041], FIG. 6), for example, describes a technique for limiting current supplied to the switching elements when a square integral of the current exceeds an allowed value. This technique is used because the integral of the current squared shows almost the same tendency as the increase in temperature of the switching elements.

SUMMARY OF THE INVENTION

In view of the foregoing, switching elements are protected such that when the square integral of the current value with respect to time exceeds a threshold value, it is determined that the switching elements have overheated and the current supply is thus interrupted. However, when synchronous motors are locked after being driven by high-load low-rotation, the switching elements are destroyed by overheating even if the subsequent heat generation is low. Accordingly, the temperature of the inverters is measured and then the threshold value is changed depending on the temperature of the inverters. The accurate temperature of the switching elements thus cannot be estimated because the threshold value is simply changed depending on the initial temperature of the inverters immediately after the synchronous motors are locked.

The invention thus, among other things, estimates the accurate temperature of a switching element by adding the increase in temperature of the switching element in response to a torque instruction value to the initial value of the temperature of an inverter immediately before a synchronous motor is locked.

A synchronous-motor controller according to an embodiment of the invention thus includes an inverter for converting direct current to alternating current in order to supply a synchronous motor with a current responsive to a torque instruction value, a temperature sensor for measuring a temperature of the inverter, and a control unit. The control unit detects a locking of the synchronous motor although current is supplied to the synchronous motor, and calculates, based on the torque instruction value, a heating value of a switching element of the inverter at the time when the switching element is supplied with the current after the synchronous motor is in a locked condition, wherein a temperature of the switching element is estimated by adding the calculated heating value to an initial value of the temperature of the inverter measured by the temperature sensor when the locking of the synchronous motor is detected.

A method of operating an inverter for converting direct current to alternating current in order to supply a synchronous motor with a current responsive to a torque instruction value in accordance with another embodiment of the invention includes the steps of detecting a locking of the synchronous motor although current is supplied to the synchronous motor and calculating, based on the torque instruction value, a heating value of a switching element of the inverter at the time when the switching element is supplied with the current after the synchronous motor is in a locked condition, wherein a temperature of the switching element is estimated by adding the calculated heating value to an initial value of a measured temperature of the inverter when the locking of the synchronous motor is detected.

A synchronous-motor controller according to yet another embodiment of the invention includes means for detecting a locking of a synchronous motor although current is supplied to the synchronous motor and means for calculating, based on a torque instruction value, a heating value of a switching element of an inverter at the time when the switching element is supplied with the current after the synchronous motor is in a locked condition. A temperature of the switching element is estimated by adding the calculated heating value to an initial value of a measured temperature of the inverter when the locking of the synchronous motor is detected, and the inverter converts direct current to alternating current in order to supply the synchronous motor with a current responsive to the torque instruction value.

BRIEF DESCRIPTION OF THE DRAWINGS

Various embodiments of the invention will be described with reference to the drawings, wherein.

DETAILED DESCRIPTION OF PREFERRED EMBODIMENTS

Figure 1:
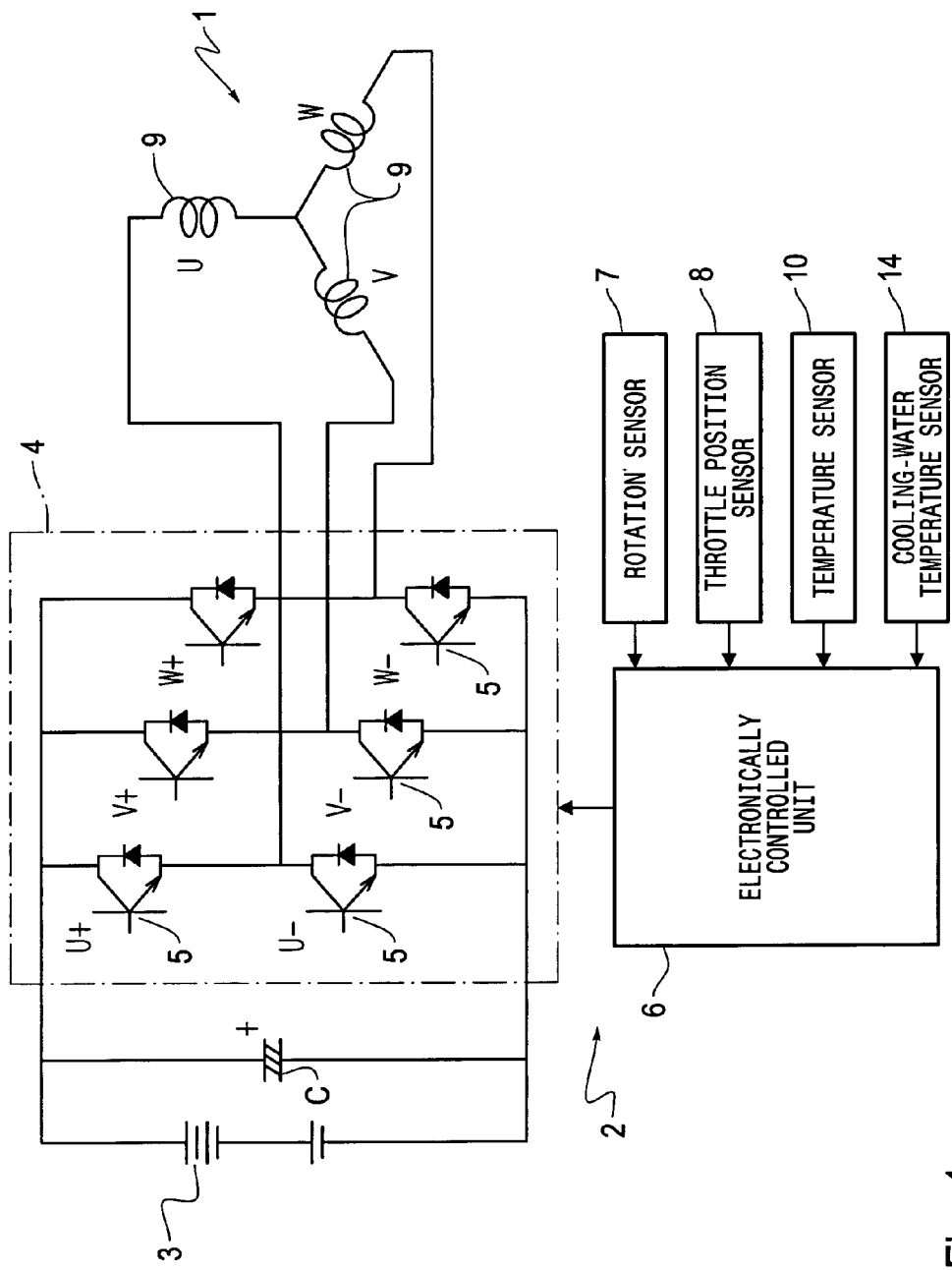
FIG. 1 is a block diagram of a synchronous-motor controller according to an embodiment of the invention.

A synchronous-motor controller according to an embodiment of the invention will be described hereinbelow with reference to the drawings. FIG. 1 is a block diagram of a controller 2 for a synchronous motor 1 serving as a motor for driving an electric vehicle. The synchronous motor 1 uses a permanent magnet for a rotor, uses a battery 3 as a power source, and is supplied with power that is converted from a direct current to an alternating current by an inverter 4. The inverter 4 includes pairs of switching elements 5 (U+ and U−, V+ and V−, and W+ and W−) corresponding to U−, V−, and W-phase coils 9 of the synchronous motor 1, respectively and converts the power by the switching operation of each switching element 5. A smoothing capacitor C is connected between the battery 3 and each switching element 5 of the inverter 4.

An electronically controlled unit 6 connects to a rotation sensor 7 for sensing the rotation phase of the synchronous motor 1 and a throttle position sensor 8 for sensing the throttle opening of a vehicle. The rotation sensor 7 sends the rotation phase of the synchronous motor 1 to the electronically controlled unit 6. The electronically controlled unit 6 determines the phase angle of three-phase alternating current supplied to the U-, V-, and W-phase coils 9 in response to the rotation phase of the synchronous motor 1 and calculates the rotation speed of the synchronous motor 1 from the change in phase angle. The electronically controlled unit 6 includes a CPU, an ROM, an RAM, and an input/output interface. Detection signals from the rotation sensor 7, the throttle position sensor 8, and a temperature sensor 10 are inputted to the electronically controlled unit 6 through the input/output interface. The signals are used to open or close the switching elements 5 in order to supply the three-phase alternating current, with a phase angle responsive to the rotation phase of the synchronous motor 1, to the U-, V-, and W-phase coils 9. The electronically controlled unit 6 calculates the torque instruction value of the synchronous motor 1 from the throttle opening sensed by the throttle position sensor 8 and performs PWM control of the switching elements 5 at a duty ratio responsive to the torque instruction value so that a current of the torque instruction value is supplied to the synchronous motor 1.

Figure 2:
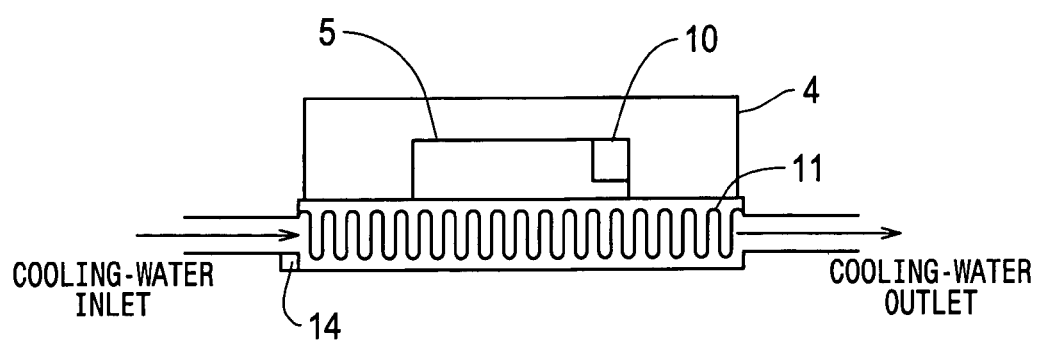
FIG. 2 is a diagram of an inverter, a switching element, a temperature sensor, a heat sink, and a cooling-water temperature sensor.

Referring to FIG. 2, the temperature sensor 10 is disposed in the vicinity of the switching element 5 of the inverter 4, which senses the temperature in the vicinity of the switching element 5. When the synchronous motor 1 is not locked (i.e., rotating), the temperature in the vicinity of the switching element 5 that is detected by the temperature sensor 10 is considerably close to the actual temperature of the switching element 5. The inverter 4 includes a heat sink 11. The switching elements 5 of the inverter 4 are cooled by cooling water flowing from the inlet toward the outlet of the heat sink 11. A cooling-water temperature sensor 14 is mounted to the inlet of the heat sink 11 to measure the temperature of the cooling water flowing into the heat sink 11.

Figure 3:
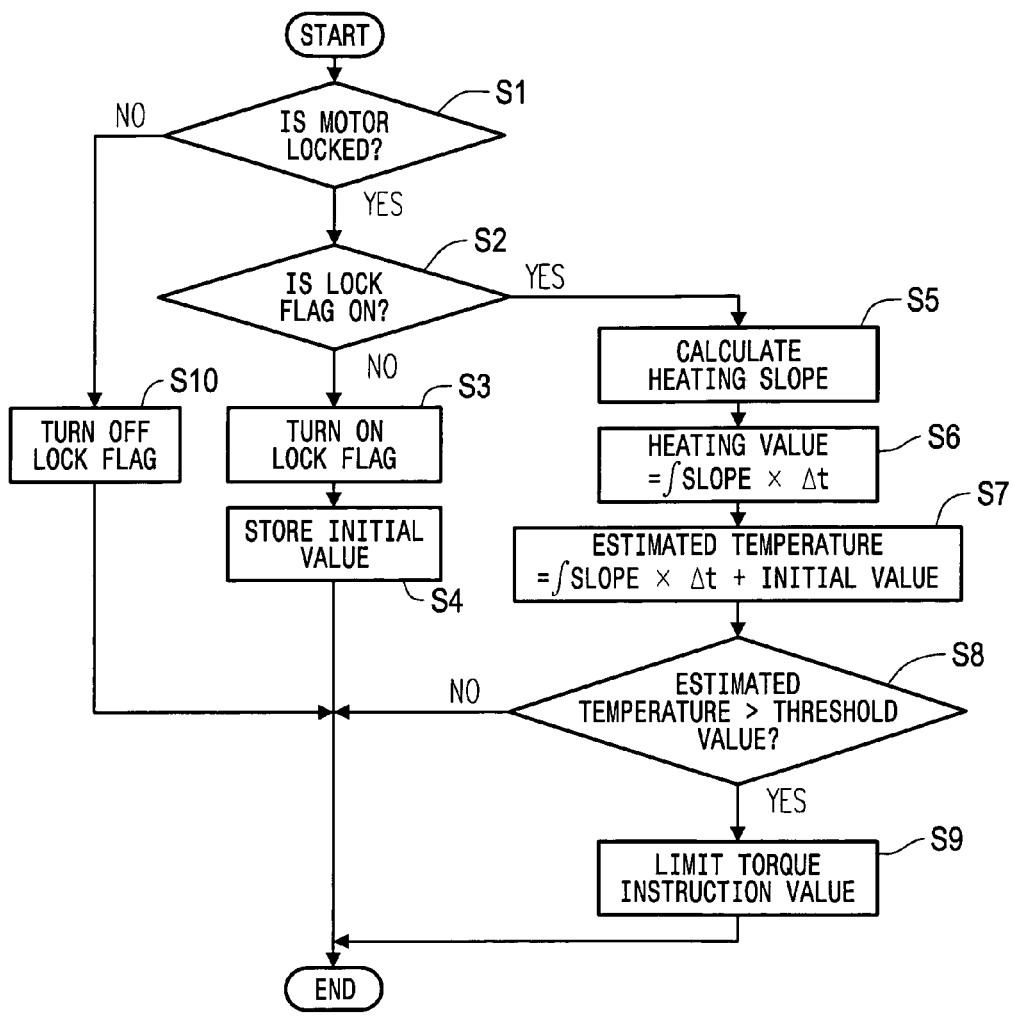
FIG. 3 is a flowchart for an overheating protection program.

The controller 2 of the synchronous motor 1 will now be described together with the operation. An overheating protection program, as shown in FIG. 3, for protecting the switching elements 5 from overheating is registered in the ROM of the electronically controlled unit 6 and is repeatedly executed at very short intervals by the CPU. In step S1, it is determined whether the synchronous motor 1 is in a locked condition. The locked condition denotes a condition in which the synchronous motor 1 is not rotating in spite of the fact that the torque instruction value is larger than a predetermined torque instruction value. If a torque instruction value is smaller than the predetermined torque instruction value, the stall of a vehicle and the lock of the synchronous motor 1 can be tolerated while the synchronous motor 1 is supplied with a low current based on the torque instruction value. Accordingly, in step S1, the CPU determines whether the signal from the throttle position sensor 8 is larger than a predetermined throttle opening responsive to the predetermined torque instruction value. The CPU also determines whether the rotation speed calculated from the detection signal of the rotation sensor 7 is approximately zero. When the throttle opening is larger than the predetermined throttle opening and the rotation speed is approximately zero, it is determined that the synchronous motor 1 is in a locked condition. Briefly, step S1 detects the locking of the synchronous motor 1 in spite of the fact that current is supplied. When the synchronous motor 1 is not in the locked condition in step S1, the lock flag is turned off and the execution of the overheating protection program is finished (step S110). When it is determined that the synchronous motor 1 is locked and a lock flag is off (step S2), the lock flag is turned on (step S3). An estimated temperature is then obtained by taking the temperature measured by the temperature sensor 10 in order to calculate the temperature at the center of the switching element 5. As should be appreciated, the temperature is at the highest temperature at the center of the switching element 5. The estimated temperature is then stored as an initial value (step S4). The overheating protection program is thus finished.

Figure 4:
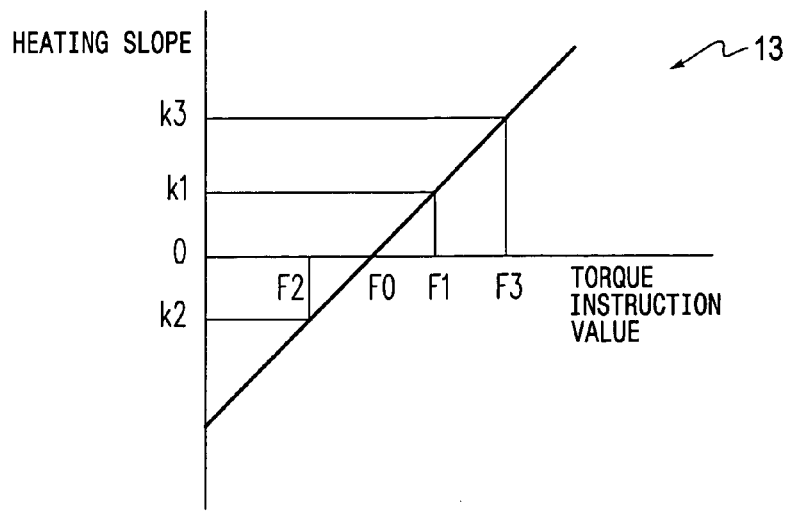
FIG. 4 is a heating slope map.

When the program is again executed after a lapse of a very short time $\Delta t$, when the synchronous motor 1 is in a locked condition, a heating slope responsive to the present torque instruction value calculated from the throttle opening, which is determined by the throttle position sensor 8, is calculated from a heating slope map 13 of FIG. 4 (step S5). As should be appreciated, the very short time $\Delta t$ is a time in which the CPU can again executes the program. The synchronous motor 1 is in the locked condition because the lock flag has been turned on in the preceding execution of the program. The heating slope map 13 shows a heating slope (° C./s) that is obtained by experimentation. The heating slope map 13 is created by increasing the temperature of the switching element 5 per second when the three-phase alternating current is supplied to the synchronous motor 1 to output the torque instruction values. One example of mapping is as follows: the heating slope (° C./s) of the switching element 5 to which the maximum current of a three-phase alternating current is supplied is obtained by experiment. The heating slope is obtained in order to map the three-phase alternating current that is being supplied to the three-phase coils 9 of the synchronous motor 1 in the form of direct current to output a torque instruction value with the current having a phase relationship in which the maximum current flows in one phase. The torque instruction value is calculated from a throttle opening when the synchronous motor 1 is locked. The obtained heating slope is multiplied by the very short time $\Delta t$ to obtain a very-short-time heating value for the very small time $\Delta t$. The very-short-time heating value is integrated to obtain a heating value that is an increased amount of temperature from the time the synchronous motor 1 is locked (step S6), which is then added to the initial value to calculate an estimated temperature Ts of the switching element 5 (step S7).

The heating value of the switching element 5 of the inverter 4 that is calculated in response to the torque instruction value, when supplied with current after the synchronous motor 1 is locked, includes steps S5 and S6 of the overheating protection program 12 with the heating slope map 13.

The overheating protection program is thus executed at very short time intervals, wherein when the locking of the synchronous motor 1 is first detected, the temperature of the inverter 4 sensed by the temperature sensor 10 is stored as the initial value. The heating slope responsive to each torque instruction value for each very short time $\Delta t$ is also calculated according to the heat-generation slope map 13. Furthermore, the integral of the product obtained by multiplying each heating slope by a very short time $\Delta t$ is added to the initial value to calculate the estimated temperature Ts of the switching element 5. It is then determined whether the estimated temperature Ts is higher than the threshold value (step S8). When the estimated temperature is lower than the threshold value, the execution of the overheating protection program is finished. When the estimated temperature is higher, the torque instruction value calculated from the throttle opening is limited to a value at which the heating slope becomes zero (step S9).

Figure 5:
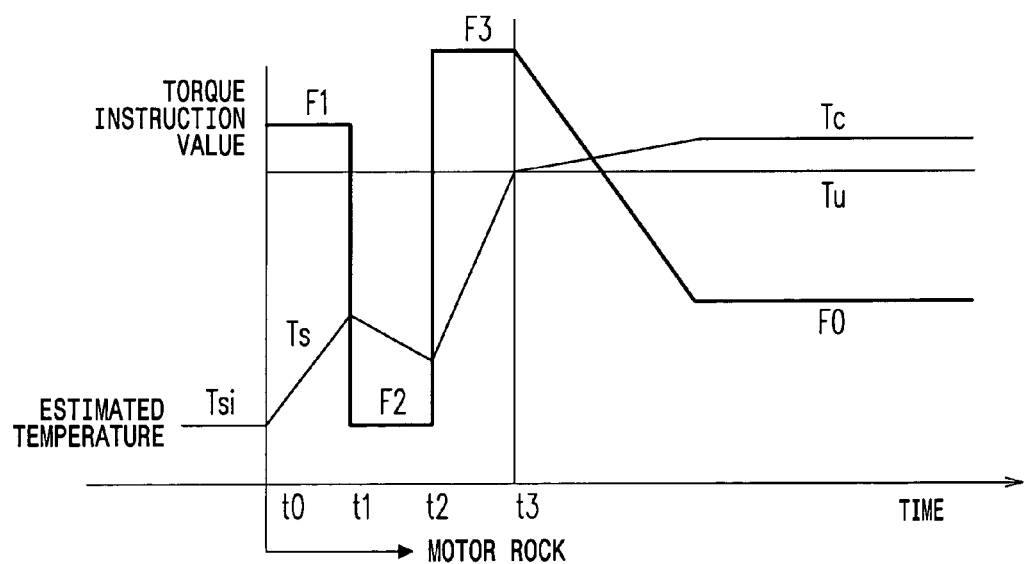
FIG. 5 is a graph of the progression, after motor locking, of the estimated temperature of the switching element and a torque instruction value.

For example, also referring to FIG. 5, when the locking of the synchronous motor 1 is determined at time t0, the temperature measured by the temperature sensor 10 is stored as the initial value Tsi of the estimated temperature Ts of the switching element 5. A heating slope k1 corresponding to a torque instruction value F1 calculated from the throttle opening at that time is obtained from the heating slope map 13. The initial value is added to the integral of the product obtained by multiplying the heating slope by the very short time Δt to calculate the estimated temperature Ts of the switching element 5 for each lapse of the very short time Δt. Suppose the torque instruction value is reduced to F2 at time t1. A heating slope k2 corresponding to a torque instruction value F2 is then obtained from the heating slope map 13. Since the heating slope k2 is negative, the estimated temperature Ts of the switching element 5 decreases at heating slope k2. When the torque instruction value increases to F3 at time t2, a heating slope k3 corresponding to a torque instruction value F3 is obtained from the heating slope map 13. The estimated temperature Ts of the switching element 5 increases at heating slope k3. When the estimated temperature Ts of the switching element 5 exceeds a threshold value Tu at time t3, the torque instruction value F3 is reduced to a torque limit value which is a torque instruction value F0 at which the heating slope becomes zero. The threshold value Tu is set lower than a temperature Tc at which the switching element 5 can be continuously energized and set so that the temperature of the switching element 5 becomes the temperature Tc which allows continuous energization when the torque instruction value is reduced to the torque limit value. The estimated temperature Ts increases since the heating slope is positive until the torque instruction value reduces to the torque limit value. When the heating slope soon reaches zero, the temperature of the switching element 5 reaches the temperature Tc that allows continuous energization. At that time, the cooling capacity of the heat sink increases with a decreasing temperature of the cooling water, thus increasing a torque instruction value at which heating slope is zero. Thus, the torque limit value is determined depending on the temperature Tw of inlet-side cooling water flowing into the heat sink 11.

According to the embodiment, calculating the heating slope of the switching element 5 of the inverter 4 when supplied with current, in response to the torque instruction value, includes the heating slope map 13 that stores heating slopes corresponding to torque instruction values. Alternatively, the relationship between the torque instruction values and the heating slopes may be stored in the form of a numerical expression.

According to the embodiment, when a heating slope is calculated, a map is included in which the heating slope (° C./s) of the switching element 5, which is supplied with the maximum current of a three-phase current in the form of a direct current, is obtained by experiment to map. This occurs when the synchronous motor 1 is locked with a phase relationship in which one of the three-phase coils of the synchronous motor 1 flows the maximum current. Alternatively, it is also possible to calculate a current applied to each of the three-phase coils in response to the torque instruction value in the rotation phase of the synchronous motor 1 which is sensed by the rotation sensor 7 in a locked condition and to calculate the heating slope (° C./s) of the switching element 5 from a map or by a numerical expression when the maximum current of which is supplied in the form of direct current.

According to the embodiment, the three-phase alternating current to be supplied to the synchronous motor 1 to output torque instruction values is mapped such that, for example, when the three-phase current in which the maximum current flows in one phase is applied to the switching element 5 of each phase in the form of direct current, the heating slope (° C./s) of the switching element 5 to which the maximum current is supplied is mapped by experiment. Alternatively, the very-short-time heating value during the very short time Δt may be mapped by experiment. With such a method, the very-short-time heating value responsive to the torque instruction value for each very short time Δt can be obtained directly from the map, and the very-short-time heating value can be integrated to provide a heating value after the synchronous motor 1 is locked.

According to an exemplary aspect of the invention, the heating value of the switching element according to each torque instruction value with the synchronous motor in a locked state is obtained in advance by experiment and stored in a map. Accordingly, a realistic heating value can be calculated with a simple structure and, even if the torque instruction value changes while the synchronous motor is locked, an accurate heating value can be calculated to estimate the temperature of the switching element because the very-short-time heating value is integrated while changing the very-short-time heating value depending on the torque instruction value.

According to another exemplary aspect of the invention, the heating value of the switching element according to each torque instruction value while the synchronous motor is locked is obtained in advance by experiment at different temperatures of heat-sink inlet-side cooling water and different ambient temperatures, at least one of which is stored in a plurality of maps by temperature. Accordingly, the heating value at each inlet-side cooling-water temperature and each ambient temperature can be calculated with a simple structure.

According to another exemplary aspect of the invention, when the estimated temperature of the switching element exceeds a threshold value, the torque instruction value is limited. This prevents the switching element from overheating to be damaged.

For the purposes of this disclosure, device and means may be considered synonyms. Further, in some cases, as defined in the specification, the device/means may include other elements.

The invention is not limited to the aforementioned embodiments, and various modifications based on the purpose of the invention are possible, which are regarded as within the scope of the invention.

What is claimed is:

1. A synchronous-motor controller comprising:
    an inverter for converting direct current to three-phase alternating current in order to supply a synchronous motor with a current responsive to a torque instruction value;
    a temperature sensor for measuring a temperature of the inverter; and
    a control unit that:
        detects a locking of the synchronous motor although current is supplied to the synchronous motor; and calculates, based on the torque instruction value, a
heating value of a switching element of the inverter
at the time when the switching element is supplied
with the current after the synchronous motor is in a
locked condition, wherein a temperature of the
switching element is estimated by adding the calculated heating value to an initial value of the temperature of the inverter measured by the temperature
sensor when the locking of the synchronous motor is
detected.

2. The synchronous-motor controller according to claim 1, wherein the control unit includes a map that stores the relationship between the torque instruction value and a very-short-time heating value, wherein the very-short-time heating value is integrated to determine the heating value.

3. The synchronous-motor controller according to claim 2, wherein the control unit calculates the heating value depending on at least one of the inlet-side cooling water of a heat sink of the inverter and ambient temperature.

4. The synchronous-motor controller according to claim 3, wherein when the estimated temperature exceeds a threshold value, the torque instruction value is limited.

5. The synchronous-motor controller according to claim 2, wherein when the estimated temperature exceeds a threshold value, the torque instruction value is limited.

6. The synchronous-motor controller according to claim 1, wherein when the estimated temperature exceeds a threshold value, the torque instruction value is limited.

7. The synchronous-motor controller according to claim 1, wherein the control unit detects the locking of the synchronous motor when current is supplied to the synchronous motor.

8. The synchronous-motor controller according to claim 1, wherein the locked condition is a condition in which the synchronous motor is not rotating although the torque instruction value is larger than a predetermined torque instruction value.

9. The synchronous-motor controller according to claim 1, wherein the locked condition is detected when a throttle opening is larger than a predetermined throttle opening and a rotation speed of the synchronous motor is approximately zero.

10. A vehicle comprising the synchronous-motor controller according to claim 1.

11. A method of operating an inverter for converting direct current to three-phase alternating current in order to supply a synchronous motor with a current responsive to a torque instruction value, comprising:
detecting a locking of the synchronous motor although current is supplied to the synchronous motor; and
calculating, based on the torque instruction value, a heating value of a switching element of the inverter at the time when the switching element is supplied with the current after the synchronous motor is in a locked condition, wherein a temperature of the switching element is estimated by adding the calculated heating value to an initial value of a measured temperature of the inverter when the locking of the synchronous motor is detected.

12. The method of claim 11, wherein a map stores the relationship between the torque instruction value and a very-short-time heating value with the very-short-time heating value integrated to determine the heating value.

13. The method of claim 12, wherein the heating value is calculated depending on at least one of the inlet-side cooling water of a heat sink of the inverter and ambient temperature.

14. The method of claim 13, wherein when the estimated temperature exceeds a threshold value, the torque instruction value is limited.

15. The method of claim 12, wherein when the estimated temperature exceeds a threshold value, the torque instruction value is limited.

16. The method of claim 11, wherein when the estimated temperature exceeds a threshold value, the torque instruction value is limited.

17. The method of claim 11, wherein the locking of the synchronous motor is detected when current is supplied to the synchronous motor.

18. The method of claim 11, wherein the locked condition is a condition in which the synchronous motor is not rotating although the torque instruction value is larger than a predetermined torque instruction value.

19. The method of claim 11, wherein the locked condition is detected when a throttle opening is larger than a predetermined throttle opening and a rotation speed of the synchronous motor is approximately zero.

20. A synchronous-motor controller comprising:
means for detecting a locking of a three-phase synchronous motor although current is supplied to the synchronous motor; and
means for calculating, based on a torque instruction value, a heating value of a switching element of an inverter at the time when the switching element is supplied with the current after the synchronous motor is in a locked condition, wherein:
a temperature of the switching element is estimated by adding the calculated heating value to an initial value of a measured temperature of the inverter when the locking of the synchronous motor is detected, and
the inverter converts direct current to alternating current in order to supply the synchronous motor with a current responsive to the torque instruction value.

* * * * *